(12) United States Patent
Sullender

(10) Patent No.: US 8,031,963 B2
(45) Date of Patent: Oct. 4, 2011

(54) NOISE FILTER

(75) Inventor: Craig Sullender, Austin, TX (US)

(73) Assignee: Eyep Inc., Austin, TX (US)

( * ) Notice: Subject to any disclaimer, the term of this patent is extended or adjusted under 35 U.S.C. 154(b) by 810 days.

(21) Appl. No.: 12/099,833

(22) Filed: Apr. 9, 2008

(65) Prior Publication Data

US 2009/0257672 A1    Oct. 15, 2009

(51) Int. Cl.
G06K 9/40 (2006.01)

(52) U.S. Cl. ................... 382/260; 382/263; 382/266

(58) Field of Classification Search ............. 382/260, 382/263, 266, 167, 162, 173, 276, 110, 233, 382/131, 154; 250/458.1, 461.1; 348/26, 348/128; 375/240.19, 240.34; 600/317; 378/21, 62, 98.12
See application file for complete search history.

(56) References Cited

U.S. PATENT DOCUMENTS

| 5,809,105 | A * | 9/1998 | Roehm et al. | 378/98.12 |
| 6,668,097 | B1 * | 12/2003 | Hu et al. | 382/275 |
| 7,155,067 | B2 | 12/2006 | Jayant et al. | |
| 7,167,598 | B2 | 1/2007 | Vuylsteke | |
| 2003/0048368 | A1 | 3/2003 | Bosco et al. | |
| 2003/0081855 | A1 | 5/2003 | Dolazza | |
| 2003/0095715 | A1 | 5/2003 | Avinash | |

OTHER PUBLICATIONS

Kornprobst, et al., "Nonlinear operators in image restoration", 6 pages.
Sapiro, et al., "Geometric Partial Differential Equations and Image Analysis", Institute of Mathematics and It's Applications, University of Minnesota, Sep. 14, 2000, pp. 1-9.
Tomais, et al., "Bilateral Filtering for Gray and Color Images", Proceedings of the 1998 IEEE International Conference on Computer Vision, Bombay, India, 7 pages.
Tschumperle, "Fast Anisotropic Smoothing of Multi-Valued Images using Curvature-Preserving PDE's", Equipe Image/GREYC (UMR CHRS 6072), 20 pages.

* cited by examiner

*Primary Examiner* — Anh Hong Do
(74) *Attorney, Agent, or Firm* — Michael A. Ervin; M. A. Ervin & Associates

(57) ABSTRACT

Provided is a system and method for processing data and images including, but not limited to separating data into a plurality of data planes; performing noise analysis to determine an average noise amplitude and noise distribution for each data plane via a gradient calculation; applying an edge mask to weaken isolated transients in one or more of the data planes; applying a noise filter using one or more levels of filtering to one or more of the data planes; and performing detail recovery combining a composite data plane and filtered and unfiltered data planes according to the noise analysis.

32 Claims, 13 Drawing Sheets

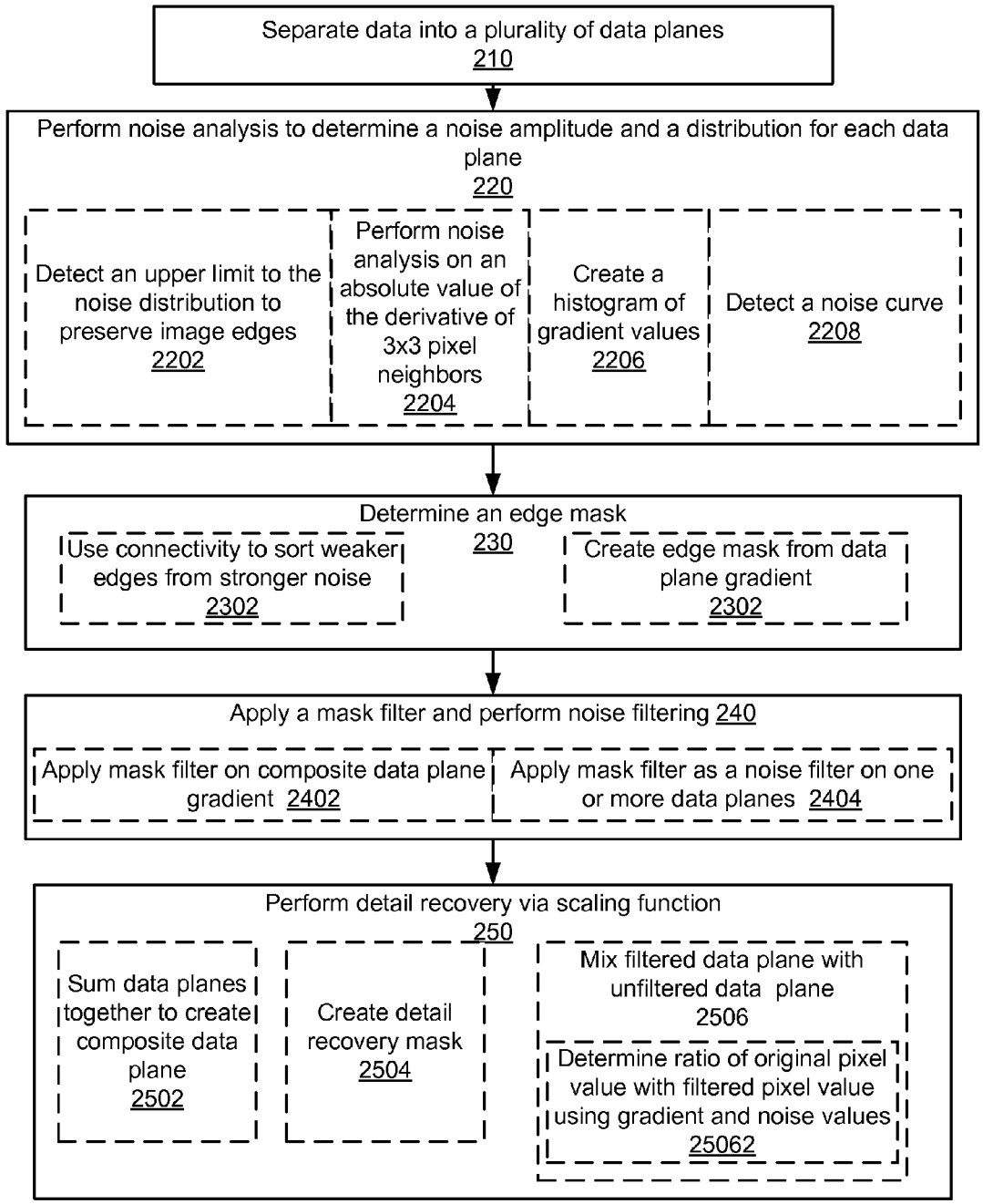

NOISE FILTER

TECHNICAL FIELD

The present application relates generally to the field of filters for use in data filtering and image processing.

BACKGROUND

Image sensors in low-resource environments, such as inexpensive machine vision products and cell phone cameras, have three major image quality problems to overcome. First is the source noise, which is random noise from low-cost CMOS image sensors. Second is that some color image sensors use color filter arrays such as the Bayer pattern made of red, green and blue color filters. Other types of color filter arrays for color image sensors may contain other colors including colorless/clear filters. Color filter arrays create a single array of data from mixed color sources, which makes simple noise filtering difficult. For example, Bayer pattern data from an image sensor cannot be filtered directly by normal means. Typically the Bayer pattern data is interpolated to complete the data plane for each color. The interpolation of noisy data creates both more data to be processed and more noisy data that must then be filtered. Third is the lack of memory and processing power typically required to filter noise with a spatial frequency spanning several pixels. What is needed is a solution for reducing noise in images and video that requires a minimum of processing power and memory space, and can take advantage of mixed source data to avoid the interpolation step. Other paradigms that have quality problems that could benefit from a filtering technique include data arranged in one dimension, such as audio data, data arranged in two dimensions such as financial data, and other data in different dimensions from one to beyond four dimensions. The data in different dimensions can have similar problems to images in that random noise can interfere with definable regions of the data necessary for understanding or performing operations on the data. Another paradigm that can benefit from a filtering technique is multiple data arrays from multiple sources, such as images taken of the same scene from cameras sensitive to different areas of the light spectrum, for example IR and UV combined with visible, or even different types of data from the same scene, for example visible images and range data. Accordingly there is a need for a noise filter that can overcome data noise in single-source data arrays, multiple-source data arrays, and multiple data arrays from multiple sources.

SUMMARY

Some embodiments described herein relate to a non-pyramidal noise filter that addresses problems with limited processing power and lack of memory for images and video. One embodiment addresses noise by filtering three octaves of a raw image without a costly pyramid structure. Noise analysis is applied to accurately preserve edges by identifying an edge value. Image details are then recovered by a function independent of correlation based approaches. Optionally, a pyramid structure can be used.

In one embodiment, noisy images are filtered using edge and detail preserving methods. Some noise is strong enough to be over the edge value found by the analysis function. Some edges and details are weak enough to fall under the level of the minimum edge value found by the analysis function.

In one embodiment, the noise filter applies a composite filter that is guided by a mask. The level of filtering varies from no filtering to a strong low-pass (blur) filter. The mask selects the filter level. A color plane is the data array for a single color source. Noise in the mask is suppressed by thresholding the color plane gradient and gradient blur at the analysis edge value. The result of thresholding the gradient is combined (logical "and") with the result of thresholding the gradient blur. When isolated spots of noise in the gradient are blurred, their values are spread over a larger area and their peak values are reduced to a level below the threshold. Although blurring smears strong edges, the blurred edges have no corresponding values in the unblurred gradient. By "ANDing" the gradient and gradient blur thresholded results, the noise spots are reduced and blurred edges rejected. Values exceeding the threshold in both images represent the location of clean strong edges in the image. The final result is that mask noise is suppressed and edges are supported. Details are recovered in the filtered image by an image detail ratio mask (detail recovery mask). In the case of Bayer pattern data, the detail recovery mask is made by adding the color planes red, greenr (red row), greenb (blue row), blue. The addition has an effect similar to correlation, in that noise is weakened while details are strengthened. Therefore the detail recovery mask has low noise and strong details. In one embodiment, the detail recovery mask is also processed by the noise filter to further suppress noise.

A method is provided for reducing noise by filtering including, but not limited to separating image data into a plurality of image planes; performing noise analysis to determine an average noise amplitude and noise distribution for each image plane via a gradient calculation; applying an edge mask to weaken isolated transients in one or more of the image planes; applying a noise filter using one or more levels of filtering to one or more of the image planes; and performing detail recovery combining filtered and unfiltered image planes according to the noise analysis.

The gradient calculation can include plotting a histogram of a plurality of gradient values to determine a maximum noise amplitude (minimum edge value) in an upper portion of the histogram and the average noise amplitude in a lower portion of the histogram. The histogram can be configured to determine a noise curve, the noise curve identified using the histogram via statistical analysis. For example, in an embodiment, the noise analysis can include locating a bin number at a determined middle of the histogram, and an upper end bin number of the histogram, the middle bin number representing the average noise amplitude, and the upper bin number representing a maximum noise (minimum edge) amplitude.

In one embodiment, the noise filter can be formed by combining a color image plane and a composite image plane. For example, forming the filter can be accomplished by combining a color image plane and a composite image plane wherein the color image plane and the composite image plane have a modified spatial alignment wherein pixel locations are superimposed. A composite image plane can include an RGGB image plane or other combination of colored image planes. The contribution of each plane to the composite plane can be scaled for best effect, for example the planes may be scaled so that the plane with the best signal to noise ratio has a more pronounced influence.

One embodiment is directed to a computer program product comprising a computer readable medium configured to perform one or more acts for removing noise from an image created from an image sensor array, the one or more acts can include but are not limited to one or more instructions for separating image data into a plurality of image planes; one or more instructions for performing noise analysis to determine an average noise amplitude and noise distribution for each image plane via a gradient calculation; one or more instructions for applying an edge mask to weaken isolated transients in one or more of the image planes; one or more instructions for applying a filter using one or more levels of filtering to one or more of the image planes; and one or more instructions for performing detail recovery combining filtered and unfiltered images planes according to the noise analysis.

Another embodiment is direct to a computer system including but not limited to a processor; a memory coupled to the processor; an image processing module coupled to the memory, the image processing module configured to attenuate noise from an image, module including a filter configured to filter one or more data arrays by combining the data array to be filtered with one or more mixed color data arrays, the one or more mixed color data arrays including a modified Bayer spatial alignment. The filter can include an image module configured to separate image data into a plurality of image planes; an analysis module coupled to the image module, the analysis module configured to perform noise analysis to determine an average noise amplitude and noise distribution for each image plane via a gradient calculation; an edge mask coupled to the analysis module, the edge mask configured to protect image edge data; and a noise filter using one or more levels of filtering to one or more of the image planes.

In one embodiment, the modified Bayer spatial alignment is a layered spatial alignment of Bayer image data. Further, the one or more mixed color data arrays can include an RGGB (red, red-row green, blue-row green, and blue) plane, the RGGB plane used as a filter mask and/or to recover detail from the image. In one or more embodiments, the one or more mixed color data arrays filter the one or more data arrays via an addition operation of the one or more mixed color data arrays with the one or more data arrays.

Another embodiment is directed to a method for filtering image data, the method including but not limited to separating image data into a plurality of data planes; performing noise analysis to determine an average noise amplitude and noise distribution for each data plane via a gradient calculation, the noise analysis performed when ambient conditions of a sensor collecting the image data change; estimating noise in the image data using the gradient calculation to determine an average value and a median value from the gradient calculation; applying a noise filter using one or more levels of filtering to one or more of the data planes, the noise filter configured to protect one or more determined edges of the image data; and performing detail recovery using a composite image plane combined with one or more filtered and unfiltered image planes according to the noise analysis. In one embodiment the method is performed in one or more of a field programmable gate array (FPGA), an application specific integrated circuit (ASIC), and/or a processor. Further, the noise analysis can include determining a gradient calculation, which can include plotting a histogram of a plurality of gradient values to determine a maximum noise value (minimum edge value) in an upper portion of the histogram and the average noise amplitude in a lower portion of the histogram. The histogram can be configured to determine a noise curve, the noise curve identified using the histogram via statistical analysis, the statistical analysis including determining an average noise amplitude and a median noise value.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which:

FIG. 2 is a flow diagram illustrating a method in accordance with an embodiment of the present invention.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

More particularly, the embodiments herein include methods appropriate for any digital imaging system wherein random noise is prevalent, such as smaller cameras, inexpensive machine vision products, cameras disposed within cell phones and the like.

Figure 1:
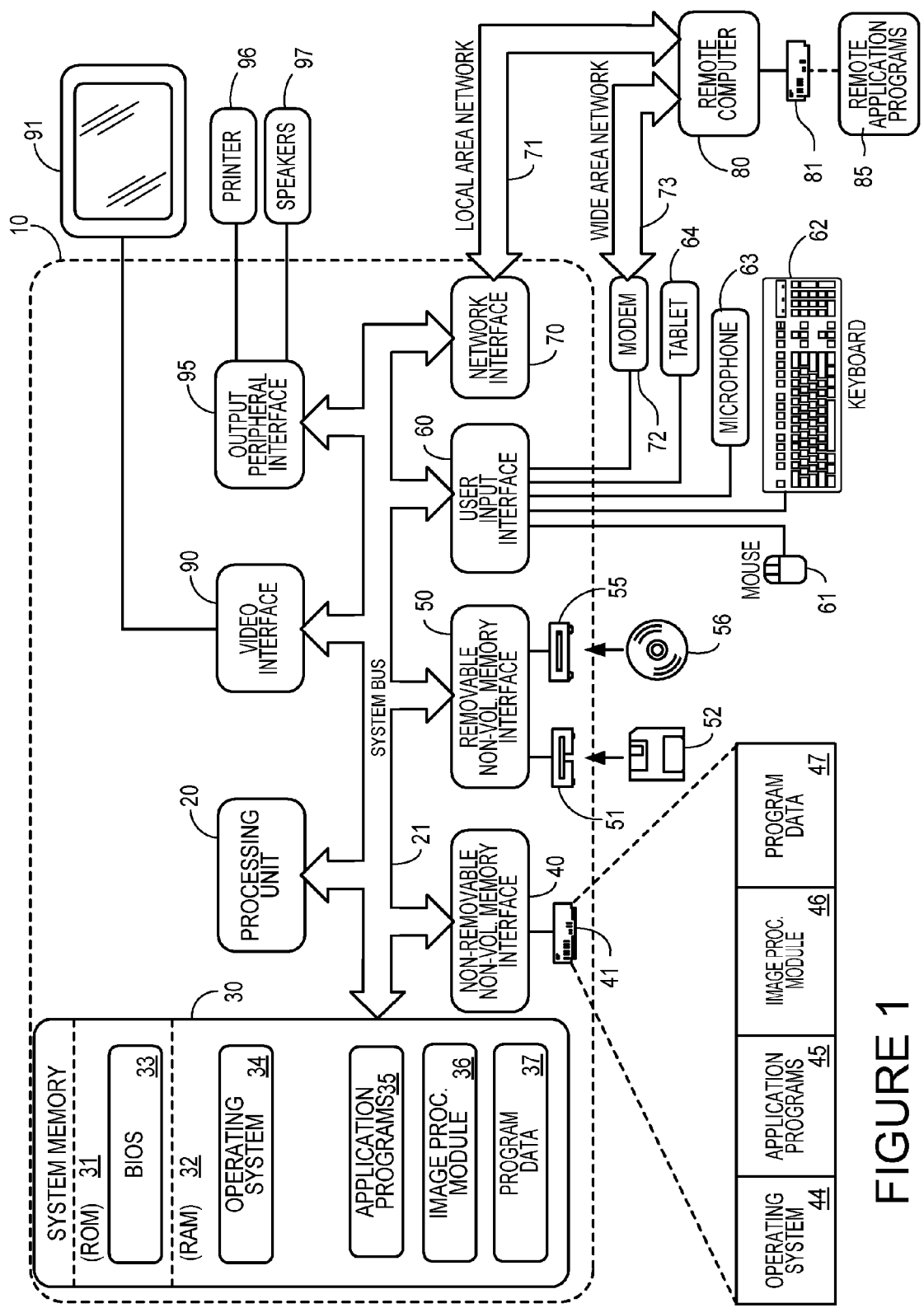
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37. FIG. 1 is shown with program modules 36 including an image processing module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50. An interface for purposes of this disclosure can mean a location on a device for inserting a drive such as hard disk drive 41 in a secured fashion, or a in a more unsecured fashion, such as interface 50. In either case, an interface includes a location for electronically attaching additional parts to the computer 10.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules, including image processing module 46 and program data 47. Program modules 46 is shown including an image processing module, which can be configured as either located in modules 36 or 46, or both locations, as one with skill in the art will appreciate. More specifically, image processing modules 36 and 46 could be in non-volatile memory in some embodiments wherein such an image processing module runs automatically in an environment. In other embodiments, image processing modules could part of an embedded system. Note that these components can either be the same as or different from operating system 34, application programs 35, other program modules, including image processing module 36, and program data 37. Operating system 44, application programs 45, other program modules, including image processing module 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like.

The computer 10 may operate in a networked environment using logical connections to one or more remote computers, which could be other cell phones with a processor or other computers, such as a remote computer 80. The remote computer 80 may be a personal computer, a server, a router, a network PC, PDA, cell phone, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operation described hereinafter can also be implemented in hardware.

FIG. 1 illustrates program modules 36 and 46 that can be configured to include a computer program for performing non-pyramidal filtering in accordance with embodiments herein. The noise filter process can be applied to different types of data. For example, in one embodiment, the noise filter process can be applied to: 1) Bayer pattern image data, such as output from image sensors or RAW image files, 2) Demosaiced (interpolated) images from any source, such as typical BMP and JPEG image files, 3) data from multiple sources such as a visible light images combined with range data, 4) data from single sources such as gray-scale images, and 5) multi-dimensional data with random noise. Further, 2-D data planes are referenced for clarity but any group of sequentially ordered data can be filtered, e.g. data arranged in 1-D, 2-D, and 3-D arrays. The analysis and filter process can be performed on arbitrary subsets of a complete image or plane of data. Also, one area of an image can be analyzed and filtered separately from another area of an image. Images can be processed on a line-by-line basis. Analysis results can be obtained from previous images or analysis can be performed incrementally while the image data is arriving from a camera. In one embodiment, the data can be filtered in groups of lines as the data arrives from the camera.

Referring now to FIG. 2, the flow diagram illustrates a method according to an embodiment. As shown, block 210 provides for separating image data into a plurality of image planes, such as five image planes. In one embodiment, the data is not image data, but data in one or more dimensions. For example, the data can be any data that is susceptible to random noise affecting the ability to dissect, operate or otherwise group the data for further understanding.

For image data, Bayer pattern data can be separated into five image planes. Each plane can be configured to be ¼ the size (length×width) of the full image and contain different Bayer color data or other image type data. In one embodiment, the planes can be Red, GR (green data from the red rows), GB (green data from the blue rows), Blue, and RGGB (a function of Red, GR, GB, Blue).

Figure 3A:
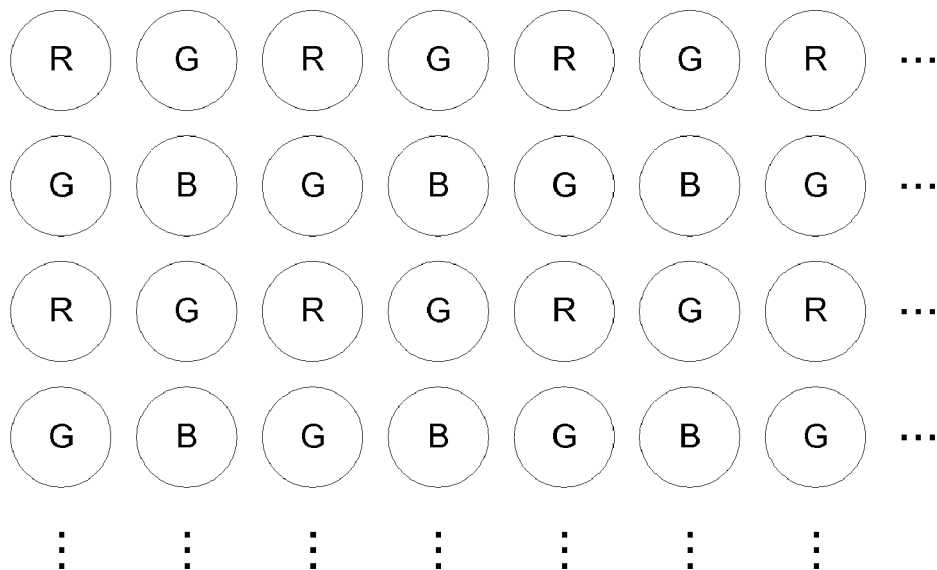
FIG. 3A, labeled "prior art" is a diagram of a Bayer sensor array appropriate for one or more embodiments of the present invention.

Referring to FIG. 3A, labeled "prior art", an exemplary diagram of a Bayer sensor array 300 illustrates how different sensors in the array configured to receive different color data.

Figure 3B:
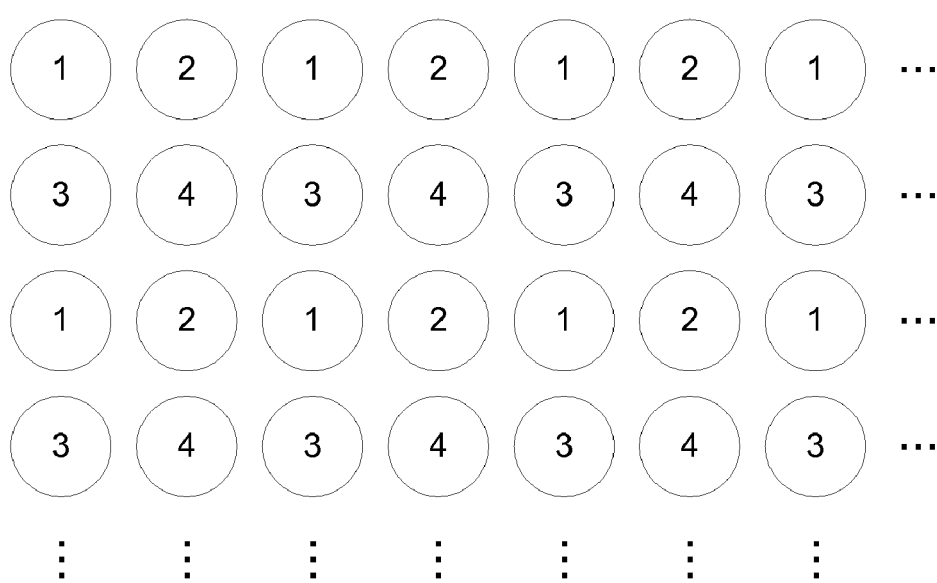
FIG. 3B is a schematic diagram of an array in accordance with an embodiment of the present invention.

Referring now to FIG. 3B, an exemplary array 310 illustrates how different sensors can be labeled agnostic to the type of data received. For example, array 310 can alternatively represent in one embodiment, a single data array from multiple sources (for example four sources (1-4)) or single data array numbering data in groups of four.

Figure 4A:
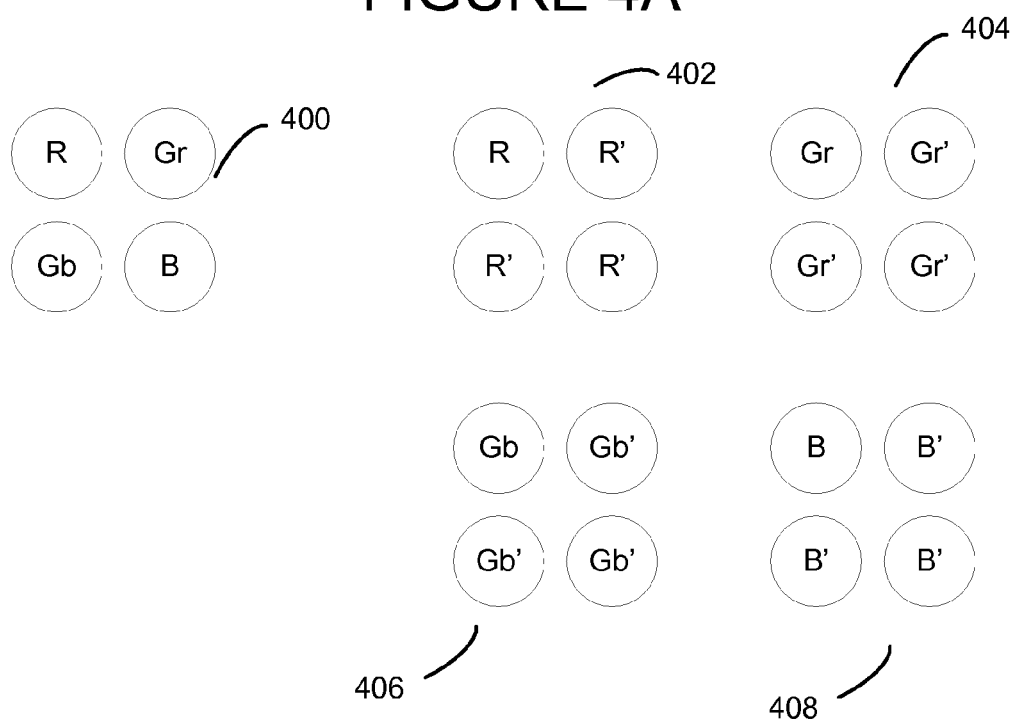
FIG. 4A is a schematic diagram of a symbolic representation of intermediate steps necessary to create a composite plane from a Bayer source in accordance with an embodiment of the present invention.
Figure 4B:
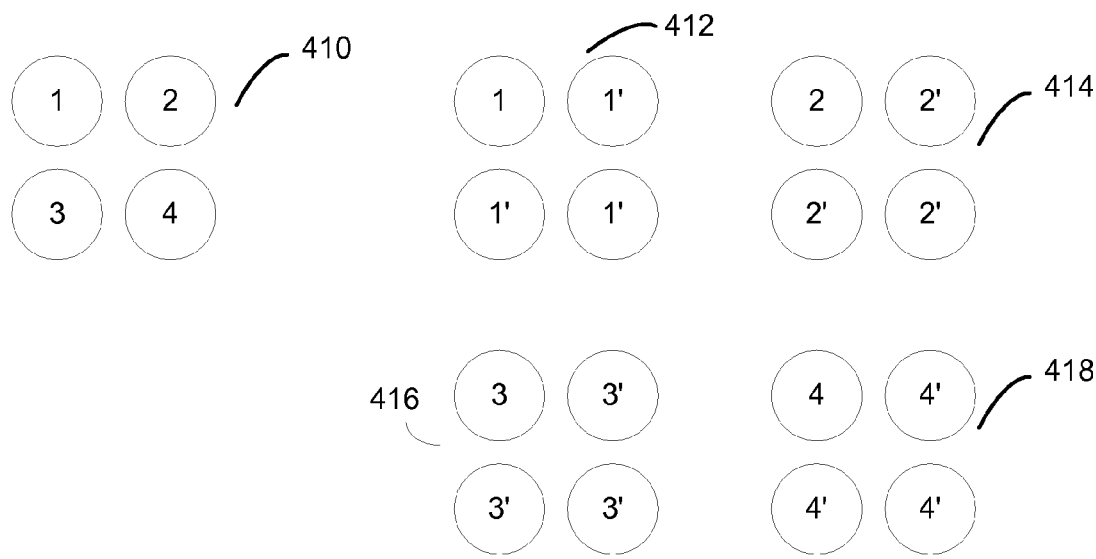
FIG. 4B is a schematic diagram of a symbolic representation of multiple data planes from multiple sources, identified as a single data source independent from identification associated with a Bayer array in accordance with an embodiment of the present invention.

Referring now to FIG. 4A, a symbolic representation of intermediate steps necessary to create a composite plane from a Bayer source is shown in accordance with an embodiment. FIG. 4B is a symbolic representation of multiple data planes from multiple sources, identified as a single data source independent from identification associated with a Bayer array.

Data values 1, 2, 3, 4, may be from a single source, such as related data from a single source such as numerical data or multiple sources.

More specifically, an input signal may be composed of a combination of signals (arrays of values) that are related but are of different types. The input signals are each affected by an independent noise source. Inexpensive embedded applications with little memory or processing power have no way of separating signal from noise.

For example, a color image is composed of red, green, and blue signals. Each type of signal can be arranged in its own data plane. If the three planes are aligned so that the first red data value corresponds to the first green data value and the first blue data value, and so on for the other data value locations in each plane, then the three values at each location can be summed into a fourth value that comprises a composite plane. The properties of the composite plane are increased signal and decreased noise due to the correlating effects of the summation of random noise. The composite plane has a more clearly separate noise component from the signal component. The composite plane can be used as is, or can be used to guide further processing.

Figure 5A:
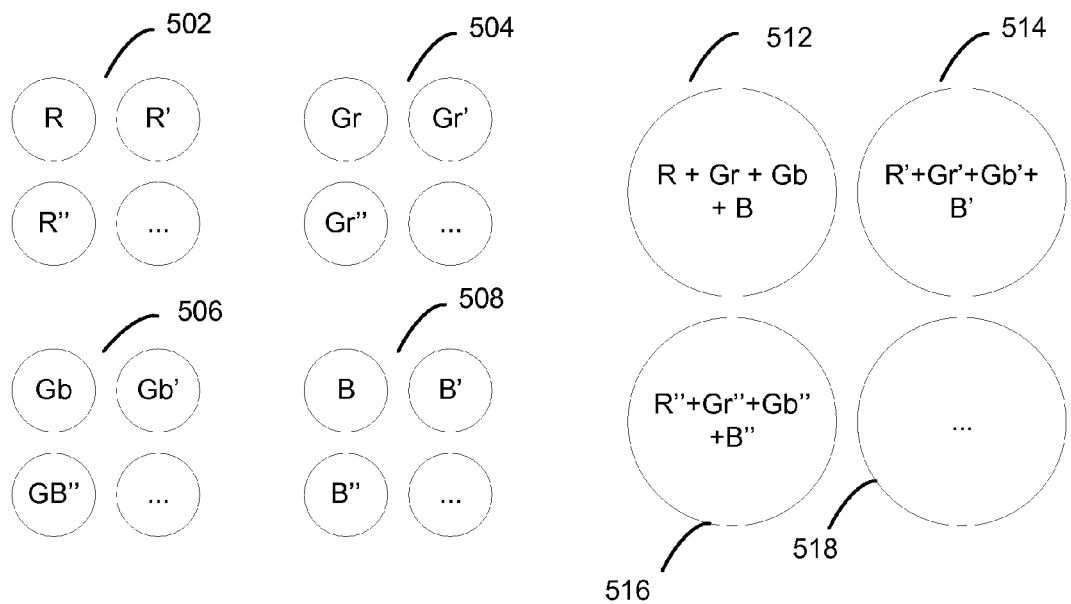
FIG. 5A is a schematic diagram illustrating the creation of a composite plane from adding four color plane values in accordance with an embodiment of the present invention.
Figure 5B:
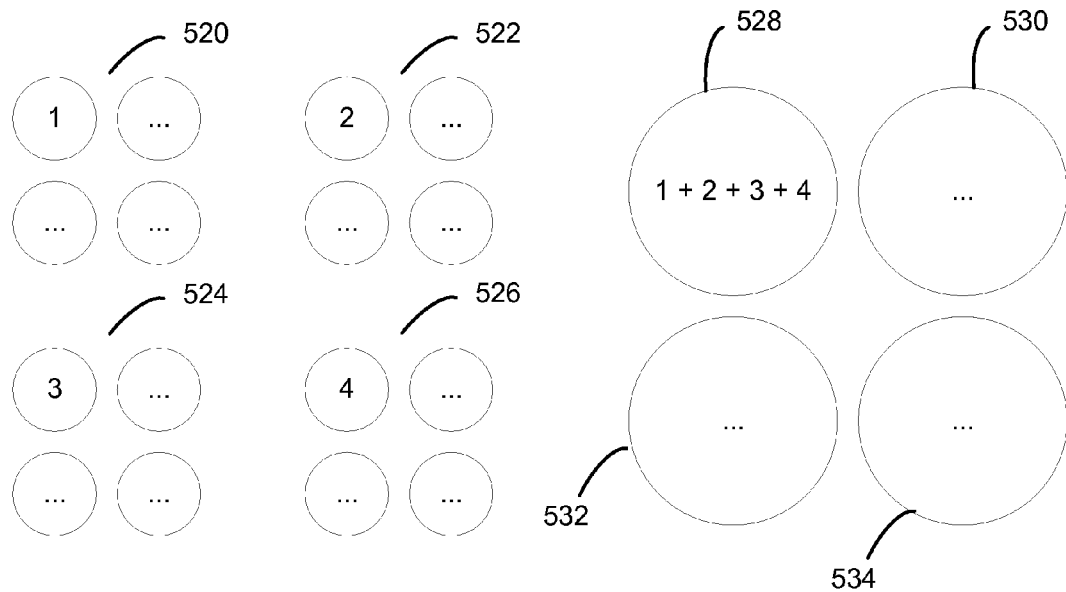
FIG. 5B is a schematic diagram illustrating a composite plane created by applying a function to four data planes in accordance with an embodiment of the present invention.

Referring now to FIG. 5A, an example illustrating the creation of a composite plane from adding four color plane values. The addition function can be replaced by other functions as will be appreciated by one of skill in the art with the benefit of this disclosure. As one of skill in the art will appreciate, a Bayer array can represent either multiple sources by assuming each pixel sensor is a different source of data, and as representing a single source of data as in a single image from the perspective of the shared characteristics of the sensor Referring to FIG. 5B, a composite plane can be created by applying a function such as addition of two or more data plane values. The example composite plane shown is configured by adding four data plane values.

Figure 6A:
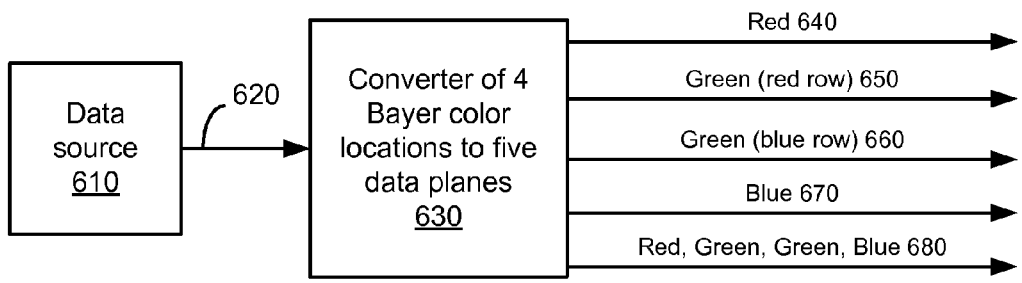
FIGS. 6A-6C are schematic diagrams illustrating an embodiment in accordance with an embodiment of the present invention.

FIG. 6A illustrates an exemplary flow diagram for separating image data. Camera 610 could be implemented as a video camera or still camera or any source that provides Bayer pixel format data. Raw pixel data 620 is provided to a Raw source converter 630 to convert four Bayer color locations into five image planes, illustrated as red 640, green from the red row of a Bayer pattern (GR) 650, Green from the blue row of a Bayer pattern (GB) 660, Blue 670, and a combination of red, green from red rows, green from blue rows, and blue (RGGB) 680. One of skill in the art with the benefit of this disclosure will discover that combining the color planes will strengthen spatially correlated details and weaken spatially uncorrelated noise.

Figure 6B:
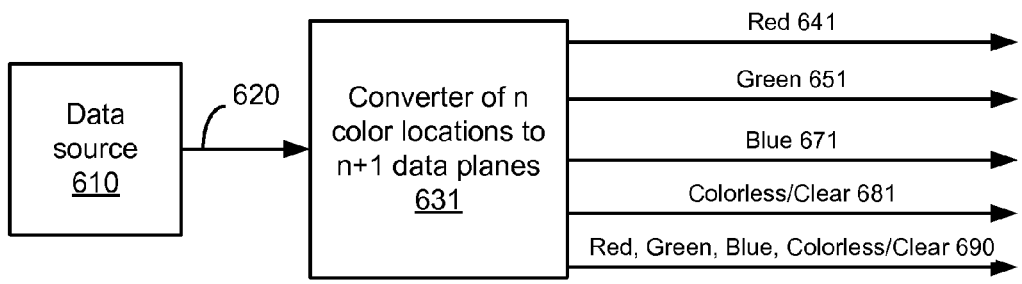

Referring now to FIG. 6B, another exemplary flow diagram for separating data planes illustrates data source 610 being passed via connection 620 to a converter of n color locations to n+1 data planes 631. In this embodiment, the output is red 641, green 651, blue 671, clear/colorless 681 and a combination of red, green, blue, and clear/colorless 690. Scaling may or may not be required of the planes that get added together, for example any of the R,G,G,B planes may/may not need scaling before making them into RGGB. In one embodiment, methods described for applying various Bayer-like patterns will apply to composite data planes from sensors including a clear/colorless data plane(s) such as those shown in FIG. 6B. For example, detail recovery and filtering can be accomplished using a composite data array including a clear/colorless data plane. In some systems it may be beneficial to scale the planes so that the plane with the best signal to noise ratio will have a greater influence on the composite plane. In such systems, the composite data plane can include an RGGB composed composite plane, an R,G,B,Clear composed composite plane or the another composite combination of diverse color/colorless planes.

Further, a subset of the total planes can be combined for the composite data plane to make edge masks and detail recovery masks, for example a clear pixel plane can be combined with one or more other types of planes to provide an advantage. The clear pixel plane can provide a good signal to noise ratio and could be the best plane to use as a filter mask for other planes under certain system requirements.

Figure 6C:
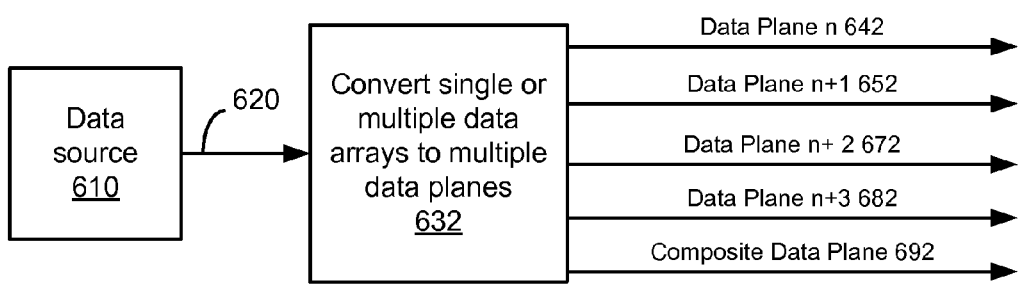

Referring now to FIG. 6C data source 610 is provided via transmission 620 to converter 632 which converts a single data array to multiple data planes. The output is data plane n 642, data plane n+1 652, data plane n+2 672, data plane n+3 682 and composite data plane 692. The single data plane is converted to multiple data planes by sorting values from the single array into multiple arrays, one value per array. For example, in the case of a Bayer array, each group of four Bayer values is sorted to four individual arrays, as in FIG. 630. The generic nature of FIG. 6C illustrates that embodiments can apply to different types of data, such as UV and IR images from different sensors wherein the composite data plane can include a combination of data from one or more UV and IR data arrays, for example as applied to image data in 631. In another embodiment, the converter can take a single or multiple data arrays that include data from otherwise incompatible data sources and perform a fusion operation. More particularly, data from "incompatible" sources can be combined, for example, data sources may be of differing resolutions or sizes. Data from a single array is combined by first splitting the array into multiple planes as in the case of the Bayer array data, treating single-source, single-array data as if it came from multiple sources.

For exemplary purposes, the embodiments described herein address the Bayer source case in a machine vision or cell phone environment. However, one of skill in the art with the benefit of this disclosure will appreciate that other sources of image data are appropriate for the noise filter process. In one embodiment, the noise filter provides filtering for data that avoids damaging characteristics of edges and details of the data regardless of the number of dimensions in the data. Thus, trends in the one or more dimensional data can be defined after filtering. In one embodiment, the data can be grouped spatially into regions that contain data elements related by predetermined qualities, such as scalar values such as brightness, or vector values such as anomalies in financial data. In such data, there are qualities in the data set that can be correlated for processing. In other words, some data have qualities that can define contiguous regions or definable qualities dependent on data location within a vector or n-dimensional array. Transitions between data groupings can be spatially extended and connected in accordance with predefined rules that determine "edges". Also, weak extended transients in the data can be defined as "details". One characteristic that can be treated as a predefined rule can include an assumption that noise influenced data has randomly distributed disconnected transitions in data values. Thus, appropriate distributed operations on the data can preserve edges and details while improving the effectiveness of noise filtering. The operations can include removal of data elements according to a decimation or removal technique in accordance with the type of data subject to operations.

The removal technique can be a function of the noise density desired of a final filtered product, or a function of other noise-related characteristics. The data sets can be organized into several data sets or planes. For example, data sets can be spatially fine grained with consistent organization with have inexact spatial agreement between data sets or planes and still be filterable in accordance with embodiments herein. In one embodiment, the number of planes data sets are assigned is a function of the best fit for the data set in accordance with organization, application, source characteristics, and signal to noise characteristics. Further, in another embodiment, the data sets can be subsets such that system resources are utilized efficiently. In another embodiment, the data sets are processed in parts to accommodate parallel processors or dedicated logic devices such as ASICs and FPGAs.

Block 220 provides for performing noise analysis to determine noise amplitude and distribution for each image plane. More particularly, noise analysis can be performed to permit filtering the image only as much as required by the noise level to protect image features and details. Optional block 2202 provides for detecting an upper limit to the noise distribution to preserve image edges. Noise analysis can be performed on Red, red row green (GR), blue row green (GB), Blue, and RGGB, or RGB, Red, green and Blue, or any combination thereof. Noise results for GR and GB might be close enough to avoid analyzing both, as will be appreciated by one of skill in the art with the benefit of this disclosure.

Noise levels are affected by sensor gain, temperature, age, and other variables. Sensor gain is automatically adjusted in the camera according to scene brightness. In one embodiment, noise analysis is performed when conditions change. In another embodiment, noise analysis is performed on video data, which can be frame by frame or as system requirements determine. For example, noise analysis can be performed: 1)

during focus, 2) on portions of the image, or 3) incrementally by sampling different areas of successive frames.

In one embodiment, shown as optional block 2204, noise analysis is performed on the absolute value of the derivative of 3×3 pixel neighbors. Pixel to pixel amplitude change is small (low gradient) for low noise. The gradient increases as noise increases. The gradient also increases for pixel to pixel differences that correspond to extended data transients such as edges.

In one embodiment, the 3×3 gradient calculation is performed according to the following code:
In simple terms, a 4-way, 3×3 gradient can be stated as follows:

$$G(x, y) = \text{abs}(p(x, y) - p(x, y-1)) + \text{abs}(p(x, y) - p(x-1, y)) + \text{abs}(p(x, y) - p(x+1, y)) + \text{abs}(p(x, y) - p(x, y+1))$$

In other embodiments, gradient calculations can be 8-way and/or 5×5.

Optional block 2206 provides for creating a histogram of the gradient values. For purposes of the present disclosure, a histogram of an image is an array consisting of a predefined number of bins. Each bin is associated with a specific pixel gradient value interval or single pixel gradient value, in such a way that the entire pixel gradient value range is covered by all subsequent bins. After computation of the histogram each bin represents the absolute or relative number of pixels in the image that have a pixel gradient value within the interval associated with the bin. The histogram can be computed as follows. Initially all bins are set to zero count. Next for each image pixel gradient value, a pixel gradient value is assigned to a predefined interval, and the corresponding bin is incremented by one. The histogram of gradient values can be restricted to those pixels that have a grey value within a subrange of the actual grey value range. This means that for each pixel of the image of local standard deviation, the corresponding histogram bin is incremented only if the corresponding pixel in the grey value image is within specified subrange. If rmin and rmax are the minimum and maximum grey values respectively of the digital image, then this subrange is defined as: [rmin+margin/(rmax−rmin), rmax−margin/(rmax−rmin)]. Typically, a margin is 3%. By restricting the histogram of gradient values to pixels with grey value within the latter subrange, one will avoid cluttering of the histogram by artifacts caused by sensor dynamic range. The histogram of local standard deviation has a very much pronounced peak approximately centered at the noise level. The noise level is defined as the centre of this peak. Alternatively, it can be defined as the local standard deviation value that corresponds to the point where the histogram is maximum, or the median value restricted to the dominant peak of the histogram.

The histogram generally will show a large response at the low end. The high frequency pixel-to-pixel random noise can cause a Gaussian-shaped curve that rises from histogram bin 0 up to a peak and then back down to a histogram location for the maximum useful noise level. A distinct noise curve may not be apparent, and could be obscured. However, noise is limited to the low end of the histogram and rarely found in the upper part of the histogram. Further, edges are found in the upper part of the histogram and do not contribute to the lower part of the histogram. In one embodiment, the noise analysis using a histogram approach can be simplified for embedded systems.

Block 2208 provides for detecting a noise curve. More specifically, detecting a noise curve can include locating a histogram bin number at the middle of an identified obscured noise curve and an upper end histogram bin number at the upper end of the curve. According to an embodiment, the lower end of the curve can be identified as bin number 0. The middle bin number represents the average noise amplitude and the upper bin number represents the maximum noise amplitude (minimum edge amplitude).

Next, the noise curve is detected by iteratively calculating the median and average gradient values from the low end of the histogram. Each iteration includes the next higher histogram bin. After initializing with the lower 10% of the histogram, the median value tends to stay near the larger grouping of higher values, while the average tends toward the middle of the curve. On the rising side of the curve, the average will be less than the median. When the average equals the median, a symmetrical distribution is contained between bin 0 and the current bin number. The average can be used for the average noise value and can be labeled Average Noise. The upper bin number is used for the maximum noise amplitude. The maximum noise amplitude indicates minimum edge amplitude, and can be labeled Minimum Edge.

The code below details the main loop of a module configured to provide a histogram representative of noise analysis. The intermediate values are reused; the complexity is linear. The noise analysis function can be configured for embedded processors that commonly host image acquisition.

```
"scaling" is the scale factor applied to each gradient data value to fit a set
size of histogram bin numbers, for example 0 to 1000.
hist[n] contains the count of gradient values in the gradient plane that
satisfy n = gradient value * scaling
// Histogram noise analysis main loop.
// "i" is the current histogram bin index.
// "avg" is the index of the average bin number (average noise).
// "mi" is the index of the bin containing the median noise value.
// "histsize" is the total number of histogram bins.
// "portion" is the fraction of gradient values already processed by the
analysis loop.
// Results: average noise = "avg" and maximum noise (or min edge) = "i"
float portion = 0.0;
int mi = 0;
int i = 0;
while((i < histsize) && ((avg <= median) || (portion < 0.1))){
    // Read the next histogram value.
    binval = hist[i];
    // sum[i] is a running sum of bin values.
    if(i == 0) sum[i] = binval;
    else sum[i] = binval + sum[i − 1];
    // Find average bin number.
    weightedsum += binval * i;
    if(sum[i]) avg = weightedsum / sum[i];
    // Median sample number = total / 2.
    mediancount = sum[i] / 2.0;
    // Check for the bin containing the median entry.
    while(sum[mi] < mediancount) mi++;
    // Adjust constant for filter strength. Use 1.0-2.0.
    median = mi + 1.5;
    portion = sum[i] / number of values in gradient plane;
    i++;
}
Average Noise = avg * (1/scaling);
Minimum Edge = i * (1/scaling);
```

Referring back to FIG. 2, block 230 provides for determining an edge mask. More particularly, in an embodiment, an edge mask can be configured to protect image edges while exposing large noise transients to a noise filter. In one embodiment, as shown as optional block 2302, a connectivity scheme could be used to sort the weaker edges from stronger noise. In another embodiment, an edge mask can be created using only a low-pass filter to weaken isolated transients.

In one embodiment, as shown in optional block 2304, the edge mask is created from the image plane gradient. More particularly, the gradient can be low-pass filtered. For each pixel location, if both the gradient and filtered gradient are greater than the maximum noise (minimum edge) amplitude for that image plane, then the corresponding pixel location in the mask is marked as an edge. The mask can be configured to require one bit of memory per pixel location.

Block 240 provides for constructing a noise filter. In one embodiment, the noise filter is constructed to avoid damaging highlights and avoid bleeding strong edges. In another embodiment, the noise filter is configured to have multiple levels of filtering from single pixel to 5×5 blur (or strong low-pass filter). The filter kernel for each level can be configured to have variable membership, i.e. some pixels in the kernel may be rejected. The edge mask and image characteristics can be used to determine filter level and kernel membership.

The following rules can be applied to the noise filter: Level 1. If the center pixel (p22) is masked, and the neighboring (3×3) pixels are different from p22 by more than the average noise value, then pass the center pixel with no filtering. Level 2. If the center pixel (p22) is masked, average with any neighboring (3×3) pixels closer than the average noise value from p22. As will be appreciated, the average noise value can be derived from the gradient, however the noise filter can also be configured to compare image pixels. Level 3. If the center pixel is not masked, and the neighboring 3×3 pixels are all masked, then pass the center pixel with no filtering. Level 4. If the center pixel is not masked, but any other pixel in the 5×5 kernel is masked, average the members of the 3×3 kernel that are not masked. Level 5. If no pixel in the 5×5 kernel is masked, average the members of the 5×5 kernel.

In one embodiment, 3×3 and 5×5 membership blur is calculated without the center pixel. Including a weighted center pixel value adds another control of the strength of the filter. The average noise value determined by noise analysis could be used to set the center pixel weight so that higher noise reduces the center pixel weight for stronger filtering. Further, filtering could be weakened as local gradient values approach the minimum edge value. Matching filter strength to noise level could be important for some applications.

As described above, the noise in the mask is suppressed by thresholding a color plane gradient and gradient blur at an analysis edge value. The result of thresholding the gradient is combined, such as by a logical AND, with the result of thresholding the gradient blur. When isolated spots of noise in the gradient are blurred, their values are spread over a larger area and peak values are reduced to a level below the threshold. Although blurring smears strong edges, the blurred edges have no corresponding values in the unblurred gradient. By "ANDing" the gradient and gradient blur thresholded results, the noise spots are reduced and blurred edges rejected. Values exceeding the threshold in both images represent the location of clean strong edges in the image. The final result is that mask noise is suppressed and edges are supported.

Optional block 2402 provides for creating a composite data plane noise filter, such as an RGGB noise filter configured as a noise filter that operates on the RGGB gradient instead of the image. Also the code can be altered for level 1 so that the RGGB image does not have to be pipelined to the noise filter.

Optional block 2404 provides for applying a noise filter as a noise filter on one or more data planes.

---

Input scalar: Noise (Average Noise scalar)
Input plane: The data plane value at spatial location (x, y) = p(x, y).
Input plane: The edge mask value at spatial location (x, y) = m(x, y).
Output plane: The filtered data plane value at spatial location (x, y) = fp(x, y).
A nonzero value for m(x, y) corresponds to an edge or detail in the image at (x, y).
A 5x5 area centered at (x, y) is analyzed in both the data plane and edge mask.
A pixel location (data value location) is considered "masked" if m(x, y) = 1.
1. If no pixels in a 5x5 area centered at (x, y) are masked, then fp(x, y) = avg 5x5 pixel values (excluding p(x, y)).
2. Else If no pixels in a 3x3 area centered at (x, y) are masked, then fp(x, y) = avg 3x3 pixel values (excluding p(x, y)).
3. Else If p(x, y) is not masked, and not all pixels in the surrounding 3x3 area are masked, then fp(x, y) = avg(all pixels (excluding p(x, y)) in the surrounding 3x3 area that are not masked).
4. Else If p(x, y) is not masked, and all pixels in the surrounding 3x3 area are masked, then fp(x, y) = p(x, y).
5. Else If p(x, y) is masked, and at least one pixel in the 3x3 area satisfies abs(p(x, y) − p(xn, yn)) < Noise, then fp(x, y) = avg(all pixels (excluding p(x, y)) in the 3x3 area that satisfy abs(p(x, y) − p(xn, yn)) < Noise).
6. Else If p(x, y) is masked, and no pixels in the 3x3 area satisfy abs(p(x, y) − p(xn, yn)) < Noise, then fp(x, y) = p(x, y).
If filtering a gradient instead of a data plane, for example when the Noise Filter is used to filter the CDP gradient, steps 5 and 6 are replaced by:
5. Else If p(x, y) is masked, then fp(x, y) = p(x, y).

---

Referring now to Block 250, the method provides for performing detail recovery via a scaling function. As one of skill in the art will appreciate, some image details may be lost if they fall under the maximum noise value. Prior art methods use correlation calculations that rely on random noise not correlating between image planes, and use correlation techniques to identify details in an image that correlate between image planes. In contrast to complicated correlation techniques, block 250 provides for performing the detail recovery function to identify details.

Optional block 2502 provides for summing the image planes together to create a composite data plane. One of skill in the art with the benefit of this disclosure will appreciate that the summing can be accomplished as a mathematical operation in a transfer function. The transfer function can also include other mathematical operations or different mathematical operations that take into account the source of the data, for example, data received over a noise channel or the like. In such cases, a transform operation or statistical probability density function appropriate for the data can be applied in the transfer function. The summing of image data planes can be performed in block 210 or according to one embodiment, a composite data plane such as an RGGB plane can be performed when required. The composite data plane can be configured to reduce uncorrelated noise while strengthening correlated image details. The composite data plane, which could be configured as an RGGB plane, advantageously identifies noise because noise will be uncorrelated and image details will remain correlated resulting in a combination of spatially uncorrelated noise in color image planes to provide noise reduction. The details and edges of interest to be identified using the RGGB plane advantageously can be in grayscale and show up in each color plane. It has been discovered that combining the color planes and ignoring the color aspects of the combination effectively suppresses the uncorrelated aspects of the combination and so provides a viable filter for detail recovery.

Optional block 2504 provides for creating a detail recovery mask. More specifically, in one embodiment, details are recovered in the filtered image by an image detail recovery mask that determines a ratio. The detail recovery mask can be made by adding the color planes red, greenr (red row), greenb (blue row), blue. The addition has an effect similar to correlation, in that noise is weakened while details are strengthened. Therefore the detail recovery mask has low noise and strong details. The detail recovery mask can also be processed by the noise filter to further suppress noise.

Optional block 2506 provides for recovering details by mixing the filtered image plane with the unfiltered image plane. For example, half of a red image plane pixel value is added to half of a filtered red image plane pixel value to recover some of the original pixel value. Depicted within optional block 2506 is optional block 25062 which provides for determining a ratio of original pixel value mixed with filtered pixel value by using the gradient and noise values. The ratio can be the gradient of the RGGB plane along with the RGGB noise results. As the RGGB gradient value increases, more of the original pixel value is restored to the filtered image. In one embodiment the range, numerator and ratio can be determined by the following equations: Range=RGGB maximum noise−RGGB average noise; Numerator=RGGB gradient value−RGGB average noise; Ratio Numerator/Range.

Figure 7:
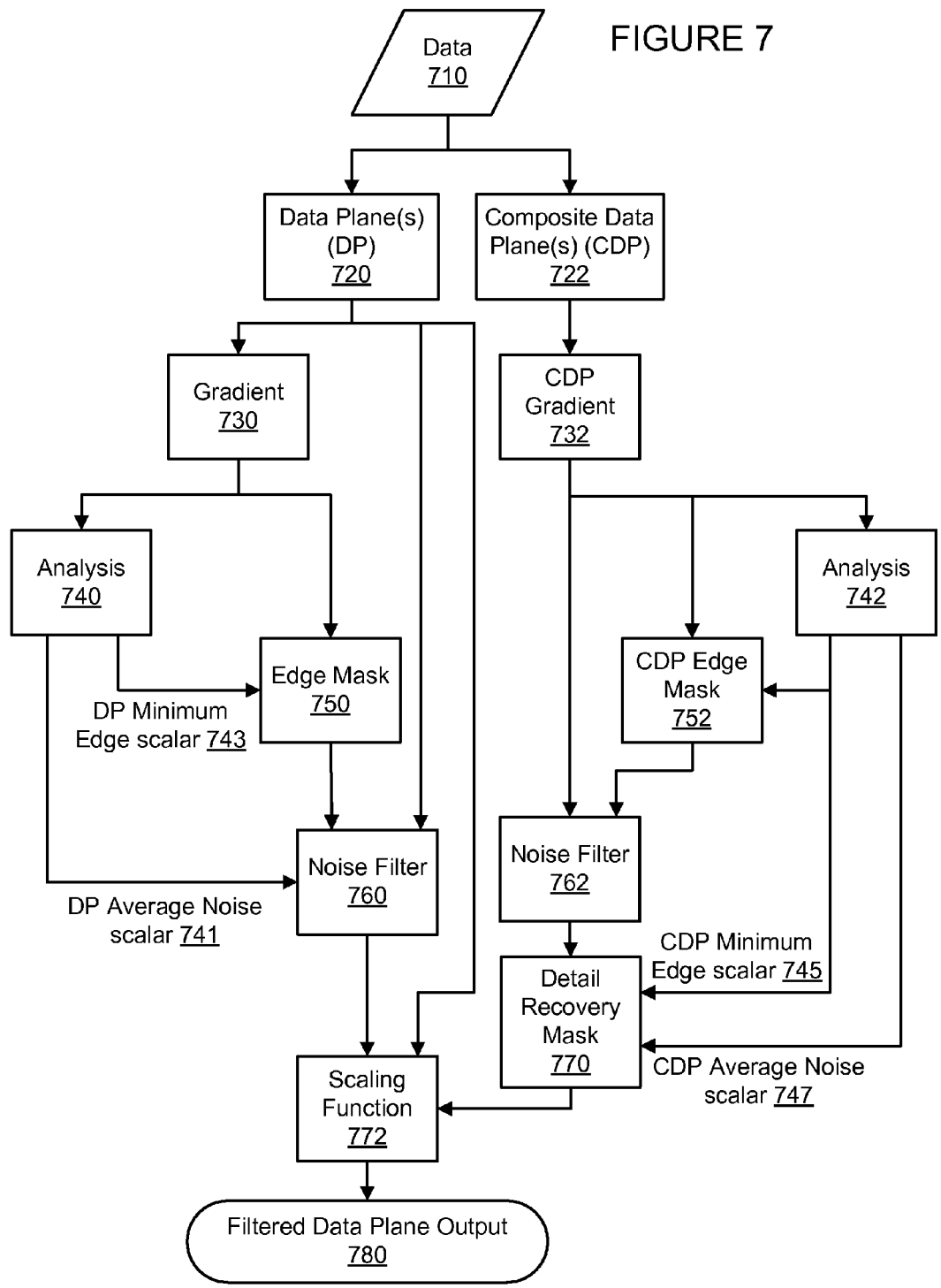
FIG. 7 is a flow diagram illustrating an embodiment in accordance with an embodiment of the present invention.

Referring now to FIG. 7, the noise filtering process is illustrated in the form of a schematic flow diagram. Block 710 illustrates the start of the process with data input. The data is separated into data planes (DP) 720, which can be image data planes in accordance with the sourced data, such as color data planes from a Bayer sensor, red, red-row green, blue-row green and blue, or red, green and blue. Block 722 provides for creating a composite data plane (CPD) such as an RGGB plane that combines different data planes. The CPD or other data planes can be directly applied to filter image data collected from a Bayer sensor to provide a one octave equivalent filtering improvement over comparable filtering of the larger interpolated image plane independent of a pyramid structure. Alternatively, a pyramid structure can be used if required or desired.

The following pseudo code illustrates a method of calculating each detail ratio value for the detail recovery mask in accordance with an embodiment:

For each location (x, y):

Detail Ratio value (x, y)=(gradient value (x, y)−CDP Average Noise)/(CDP Minimum Edge−CDP Average Noise)

0<=Detail Ratio value <=1

The process continues by determining a gradient in block 730 based on the image data planes. Similarly, block 732 provides for determining a composite data plane gradient. The gradient can be performed to enable noise analysis and other uses.

Block 740 and 742 illustrate that the gradients determined in block 730 and 732 provide data for analysis 740 and 742 respectively. As will be appreciated by those of skill the art with the benefit of the present disclosure, the noise analysis can be repeated for each data plane, including Red, GR, GB, Blue, and RGGB. The analysis of 740 and 742 produces scalar results. Specifically, analysis 740 produces scalar results including an average noise amplitude scalar 741 and a minimum edge scalar 743. Similarly, analysis 742 produces a composite data plane minimum edge scalar 745 and a composite data plane average noise scalar 747.

In one embodiment, both the minimum edge scalars 743 and 745 are used to determine an edge mask. Specifically, DP minimum edge scalar 743 and gradient data from gradient 730 both determine an edge mask. Similarly, CDP minimum edge scalar 475 and CDP gradient 732 are used to determine a CDP edge mask 752.

The average noise scalar 741, the edge mask 750 and the data planes 720 are provided to noise filter 760 to filter noise for the data planes. Unlike the data planes, noise filter 762 receives CDP edge mask 752 and gradient data from CDP gradient 732.

The output of noise filter 762 is provided to enable determining a detail recovery mask 770. Specifically, detail recovery mask 770 receives CDP minimum edge scalar 745 and CDP average noise scalar 747 and filtered data from noise filter 762.

The detail recovery mask 770 is provided to scaling function 772 along with filtered data from noise filter 760 and each of the data planes. Scaling function 772 performs detail recovery and produces filtered data plane output 780.

Figure 8:
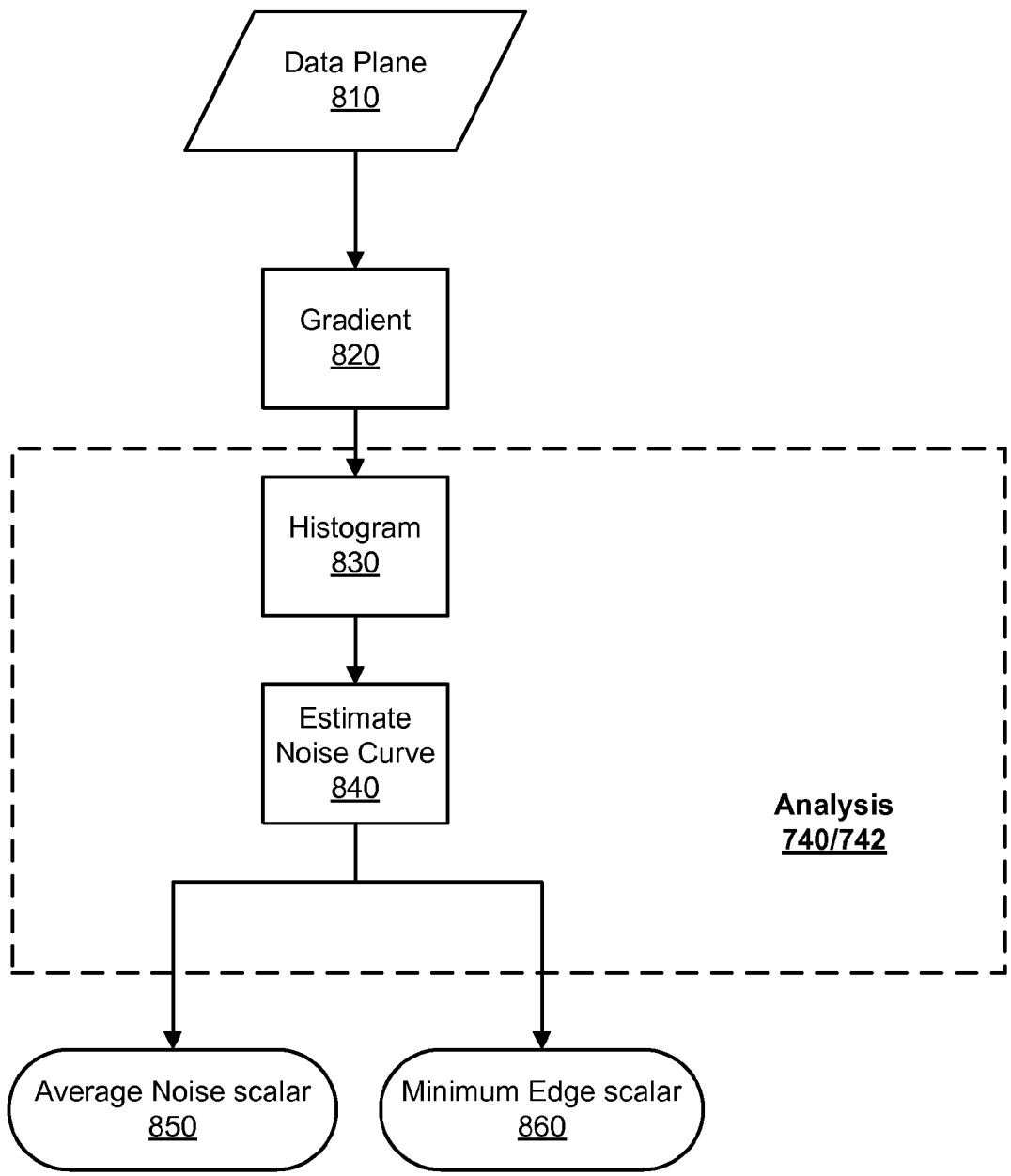
FIG. 8 is a flow diagram illustrating an embodiment in accordance with an embodiment of the present invention.

Referring now to FIG. 7 in combination with FIG. 8, an embodiment is illustrated that produces an average noise scalar and a minimum edge scalar for purposes of filtering. More specifically, FIG. 8 illustrates a flow diagram beginning with a data plane 810, which could be any type of data plane as described herein. Block 820 provides for determining a gradient of the data plane 810. Block 820 is coupled to block 740/742 which describes the analysis shown in FIG. 7 in further detail. Specifically, in one embodiment, noise analysis 740/742 includes creating a histogram 830 which is used to determine a noise curve 840. More specifically, detecting a noise curve 840 can be identified using the histogram by first using observations and statistical analysis to locate a curve. Next, after determining a beginning and ending of a curve, a user or program to locate a histogram bin number that is determined to be at the middle of a noise curve and an upper end histogram bin number at the upper end of the curve. In one embodiment, the lower end of the curve can be identified as bin number 0, or another bin number appropriate for the identified curve(s).

Figure 9:
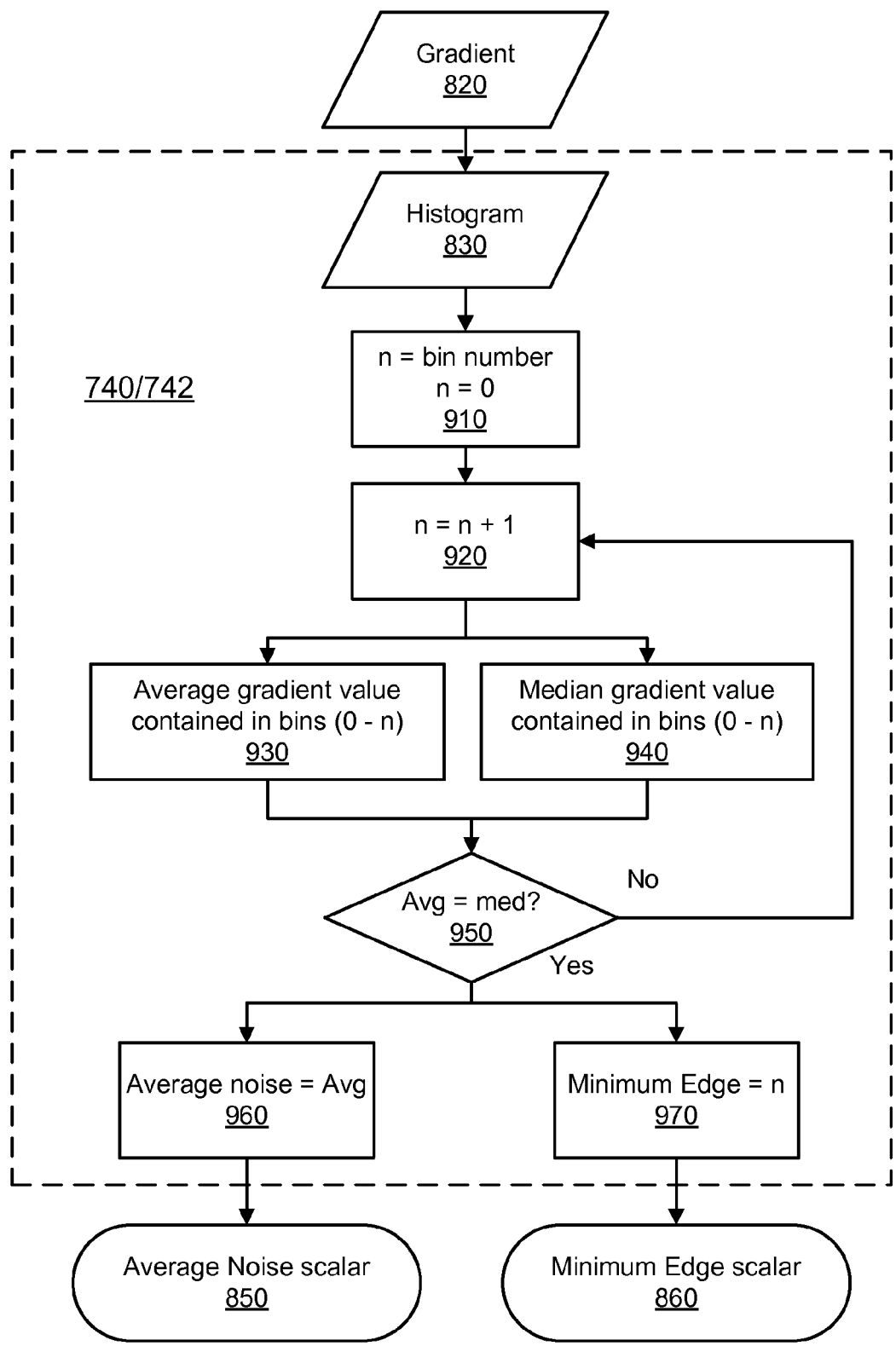
FIG. 9 is a schematic diagram illustrating an embodiment including an analysis in accordance with an embodiment of the present invention.

Referring to FIG. 9, blocks 910 through 970 more specifically describe an embodiment for estimating noise curve 840.

Block 910 provides for identifying a bin number "n" as a 0 bin number. After initializing with the lower 10% of the histogram, the median value tends to stay near the larger grouping of higher values, while the average tends toward the middle of the curve. Block 920 provides for iteratively operating on each bin number "n=n+1" such that each iteration includes the next higher histogram bin. A computer program can iteratively calculate the median and average gradient values from the low end of the histogram. Block 930 provides for identifying an average gradient value contained in bins (0–n). Block 940 provides for determining a median gradient value contained in bins (0–n). Block 950 provides for determining whether or not further calculations are required by determining whether the median gradient and the average gradient are equal. If not, the process repeats by returning to block 920. If the values are the same or within system requirements such as a range of acceptable values, the average noise amplitude 960 and minimum edge values "n" 970 are determined. On the rising side of the curve, the average will be less than the median. When the average equals the median, a symmetrical distribution is contained between bin 0 and the current bin number "n". Thus, the middle bin number represents the average noise amplitude and the upper bin number represents the maximum noise amplitude. The average determined this way is output as average noise scalar 850 to provide an average noise value. The upper bin number provides the maximum noise amplitude, which is output as the minimum edge scalar 860.

The result of analysis 740/742 is an estimate of a noise density distribution and/or edge density distribution in an image. The analysis results of 740/742 can provide approximations of noise and edge levels. It has been discovered that noise and edge values are useful because they vary with the "noisiness" "bumpiness" and "edginess" of image data. Therefore, analysis results can be used to effectively guide the filtering of a noisy image. The filtered (non-noisy) image can be processed by analysis and the results indicate edge levels more than noise levels, making the results useful for controlling segmentation. Analysis results will correspond to the noise and edge levels of random images. In one embodiment, analysis is used for natural images where the degree of previous filtering is known.

If an image was previously unfiltered, the analysis can be used to estimate a noise density distribution. The histogram of values can enable determining average noise, maximum noise, and minimum edge values of an image. In one embodiment, the values between noise and edge values provide a range of gradient values that correspond to a mixture of noise and detail edges in an image. Specifically, gradient levels above the determined edge value can be deemed probably not noise, and gradient levels above the edge value can be deemed strong edges. The analysis of an unfiltered image can be applied as a guide for a noise filter. For example, the analysis can be used to apply noise filtering to the areas of the image that produce gradients less than edge value.

In one embodiment, the analysis is of a filtered or unfiltered image, the analysis enabling the guiding of image segmentation such that some segmentation boundaries correspond to the areas of the image that produce gradients greater than the minimum edge value.

Figure 10:
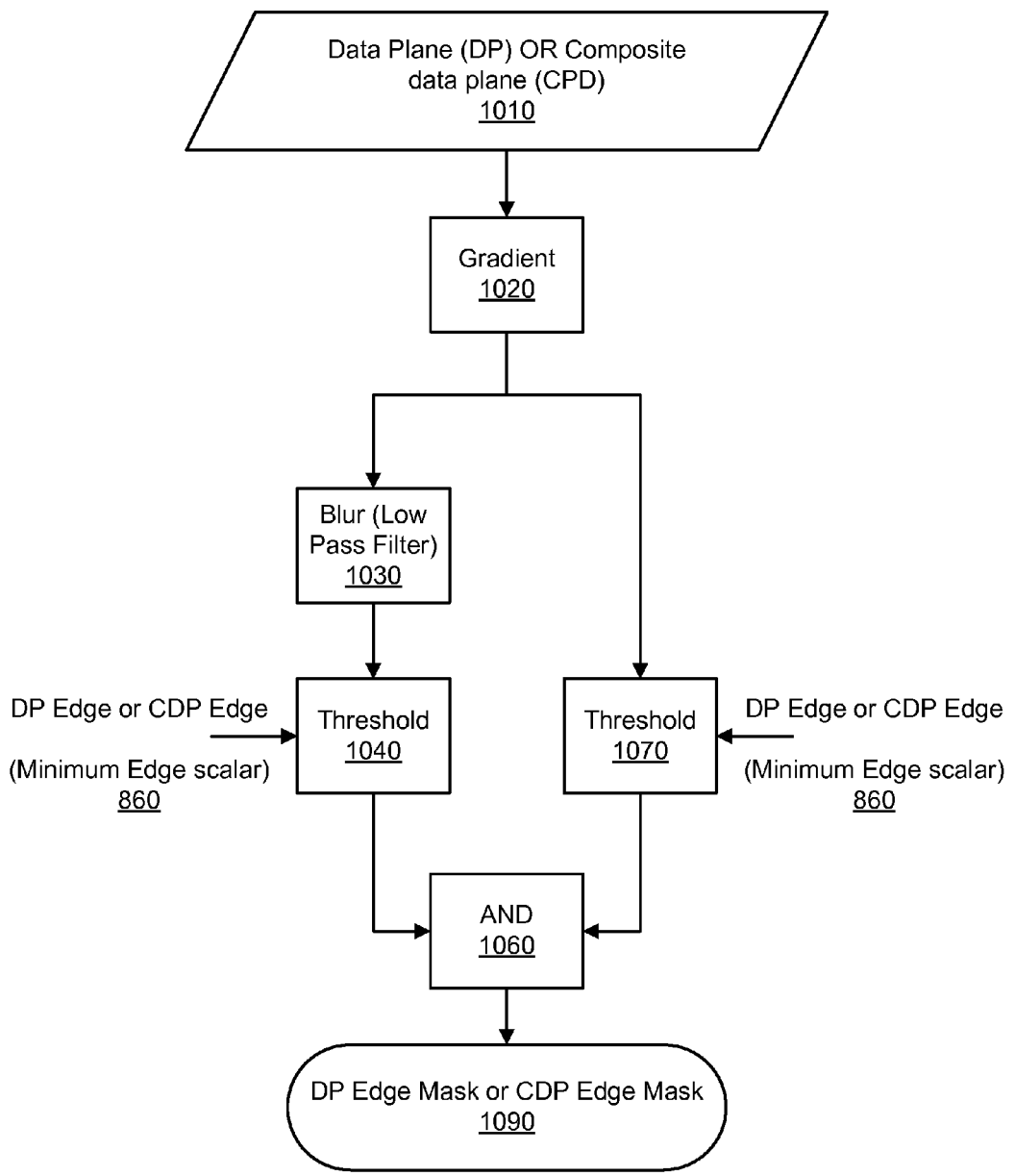
FIG. 10 is a schematic diagram illustrating another embodiment in accordance with an embodiment of the present invention.

Referring now to FIG. 10, a schematic flow diagram illustrates creating a data plane edge mask or a composite data plane edge mask. Specifically, block 1010 provides that either data plane or composite data plane is obtained. In other embodiments, the edge mask process of FIG. 10 is applied to a red mask filter, a red, blue or green mask filter. The composite data plane can be an RGGB data plane or any combination of other data planes in accordance with system requirements.

The data plane is provided to block 1020 wherein a gradient is determined. The gradient 1020 is provided to both a low pass filter 1030 and to threshold function 1070. In one embodiment, the gradient is low-pass filtered by a 5×5 blur. After performing a low pass filter operation 1030, the filtered data is provided to threshold function 1040. In one embodiment, the threshold function determines, for each pixel location, whether both the gradient and filtered gradient are greater than the maximum noise amplitude for that image plane, then the corresponding pixel location in the mask is marked as an edge. Both threshold function and 1040 and 1070 receive minimum edge scalar 860. The output of both threshold functions 1040 and 1070 are ANDed together. In other embodiments other logical functions are performed on the output of the threshold functions, as one of skill in the art with the benefit of this disclosure will appreciate. The result of ANDing the results of the thresholding is an edge mask configured to protect image edges while at the same time exposing large noise transients to the noise filter. In one embodiment, a connectivity algorithm can be used to separate weak edges from strong noise. In other embodiments, only a low-pass filter applies to weaken isolated transients. In one embodiment, the edge mask is configured to require one bit of memory per pixel location.

Figure 11:
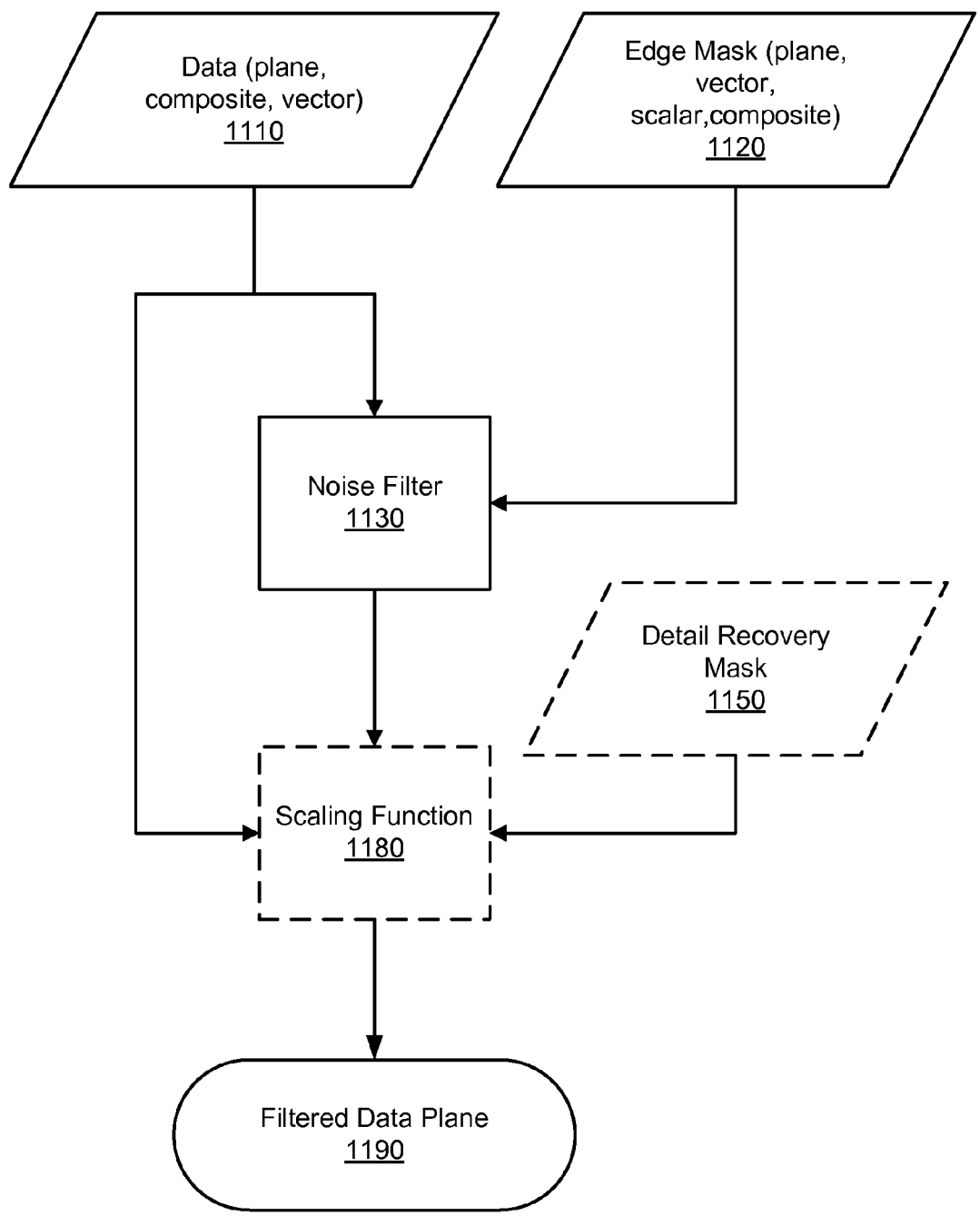
FIG. 11 is a schematic diagram illustrating an alternate embodiment of the present invention.

Referring now to FIG. 11, an embodiment is directed to a more simplified noise filter that operates by optionally performing certain functions as needed. More particularly, in an embodiment, the data plane 1110 and mask data 1120 are both provided to noise filter 1130, which operates to filter out noise that is not masked by mask 1120. The output from noise filter 1130 can be used as filtered image data. Optionally, the output of noise filter 1130 can be provided to scaling function 1180 along with the original data plane 1110 and the output of a detail recovery mask function 1150. More specifically, in one embodiment, details are recovered in the filtered image by an image detail recovery mask that determines a ratio. The detail recovery mask can be made by adding the color planes red, greenr (red row), greenb (blue row), blue. The addition weakens noise and strengthens details. The detail recovery mask can also be processed by the noise filter to further suppress noise. The output of scaling function 1180 is a filtered data plane 1190.

Figure 12:
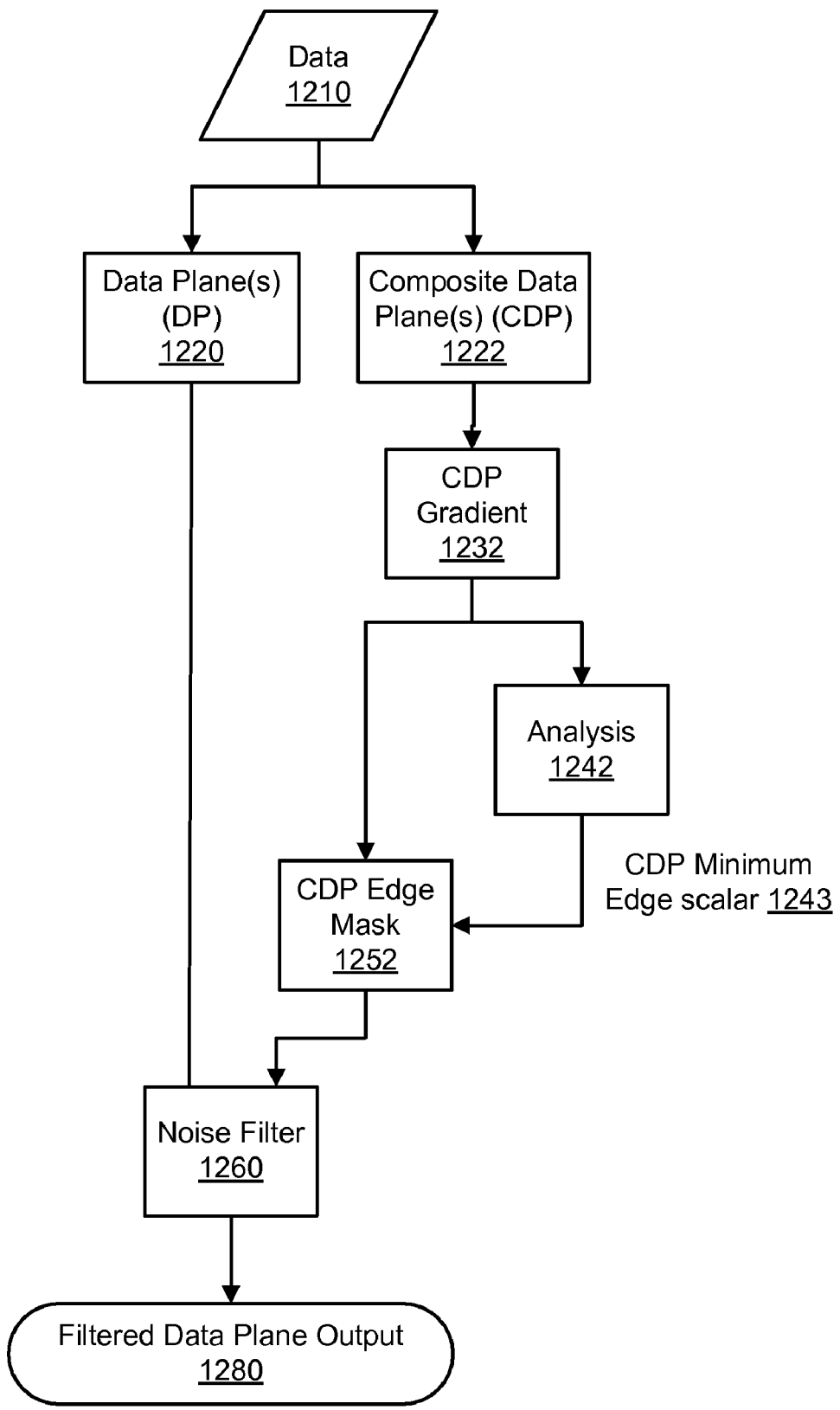
FIG. 12 is a schematic diagram illustrating an alternate embodiment of the present invention.

Referring now to FIG. 12, an embodiment is directed to a method for producing filtered data plane using one mask formed from a composite data plane, and an edge value determined from a composite data plane to provide strong filtering of unmasked areas. Specifically, the method begins with data 1210 being separated into data planes 1220 and composite data planes 1222. As described above, composite data planes can be RGGB or RGB type data planes. Composite data plane data is provided to a gradient function 1232 which determines a gradient of the data. The gradient is provided to an analysis function 1242. The analysis function 1242 outputs a minimum edge scalar based on the composite data plane which is used to determine an edge mask 1252.

The edge mask 1252 and the data plane 1220 are provided to noise filter 1260. In the embodiment of FIG. 12, a reduced process is applied that uses one mask based on a composite data plane and a single edge value also based on a composite data plane are applied to filter a non-composite data plane. The result is strong filtering of unmasked areas and no filtering of masked areas. Alternatively, detail recovery can be performed or no detail recovery can be performed following the filtering. The output of noise filter 1260 is a filtered data plane 1280 which can be combined with other filtered data planes or unfiltered data planes to improve the original image data as system requirements dictate.

In one embodiment, details for a non-composite data plane can be recovered by using composite data plane data. For example, red details can be recovered according to filtered RGGB and RGGB noise and edge content.

In actual practice, a ratio can be used to give a more pronounced effect, along with arbitrary scaling and offset to adjust overall filter strength. The RGGB ratios only need to be calculated once. Also, ratios can be recalculated in a detail recovery function for clarity.

For each location (x, y):

Filtered Data Plane Output value=(Data Plane value*Detail Recovery Mask value) +(Filtered Data Plane value*(1−Detail Recovery Mask value))

The individual image planes can be filtered in parallel or in sequence. All of the major filter functions can be pipelined. A fully parallel version of the noise filter can be configured to process one pixel per pixel clock cycle.

In one embodiment, the filtering for each image plane can be accomplished through one 3×3 window (gradient) and two 5×5 (low pass) windows. One of ordinary skill in the art with the benefit of the present disclosure will appreciate that other combinations of various filter window sizes will work.

Figure 13A:
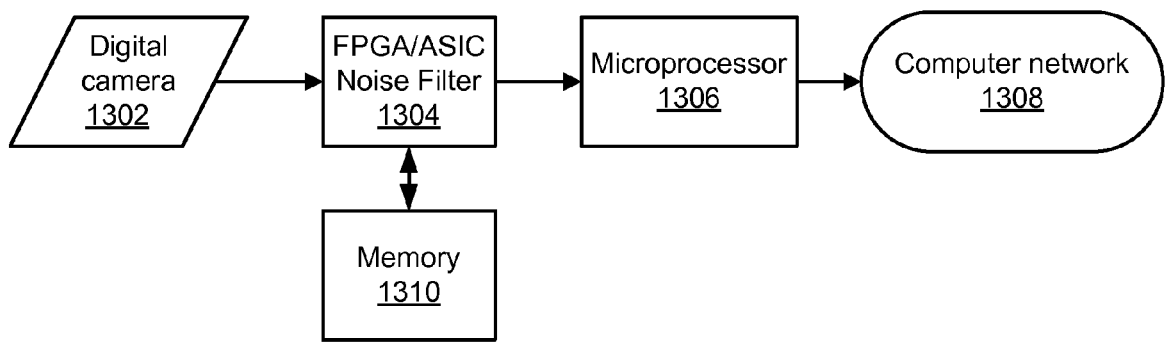
FIGS. 13A and 13B are schematic diagrams illustrating alternate embodiments for implementing the invention.
Figure 13B:
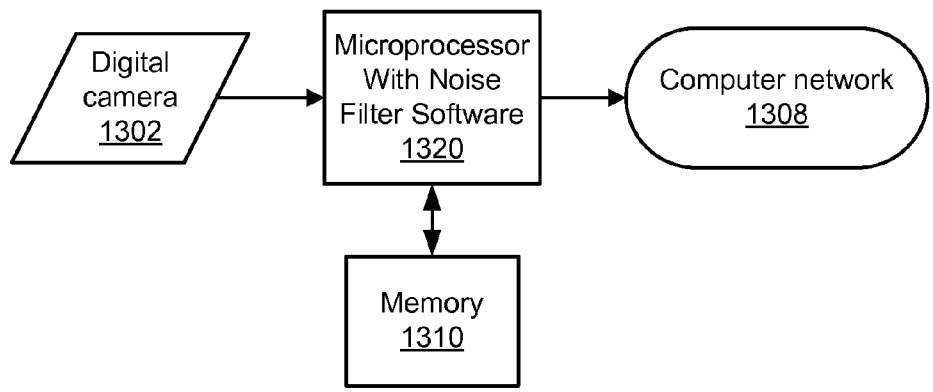

Referring now to FIGS. 13A and 13B, two schematic diagrams illustrate two embodiments for implementing a noise filter. FIGS. 13A and 13B illustrate that a system can be coupled to a digital camera 1302. FIG. 13A shows digital camera 1302 coupled to a field programmable gate array (FPGA) or an application specific integrated circuit (ASIC) 1304. FPGA or ASIC 1304 is coupled to memory 1310 to send and receive image data. Memory 1310 can be disposed within digital camera 1302 or be coupled directly to FPGA/ASIC 1304. FPGA/ASIC 1304 provides filtered data to microprocessor 1306 to process the filtered image data. Microprocessor 1306 can be coupled directly to FPGA/ASIC 1304 for immediate processing or can be buffered for later processing. Microprocessor 1306 is coupled to computer network 1308 to provide filtered image data to the Internet, back to digital camera 1302, or provided to an internet service provider to be distributed in accordance with predetermined receivers of the filtered data.

FIG. 13B illustrates a schematic diagram in accordance with an embodiment in which digital camera 1302 is coupled to microprocessor 1320. Microprocessor 1320 performs the methods described in accordance with filters described herein using noise filter software implementing disclosed embodiments. Microprocessor 1320 is coupled to memory 1310 to send and receive image data. Microprocessor 1320 is further coupled to computer network 1308 to provide filtered image data to the Internet, back to digital camera 1302, or to an internet service provider to be distributed in accordance with predetermined receivers of the filtered data.

All of the functions described above can be of linear complexity and efficient in software and parallelizable for hardware for an embedded system. The functions can be configured to operate on a whole image, on scan lines, or on arbitrary subsections of the image. The noise analysis function can be implemented in software. Further, the processes shown above can be applied with little or no alteration according to system requirements by one of skill in the art to: 1) Bayer pattern image data, such as output from image sensors or RAW image files, 2) Demosaiced (interpolated) images from any source, such as typical BMP and JPEG image files, 3) data from multiple sources such as a visible light images combined with range data, 4) data from single sources such as gray-scale images, and 5) multi-dimensional data with random noise. Further, 2-D data planes are referenced for clarity but any group of sequentially ordered data can be filtered, e.g. data arranged in 1-D, 2-D, and 3-D arrays.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

I claim:

1. A method for filtering data to overcome data noise from data arrays from image sensors, the method comprising the steps of:
   a. separating the data from the data arrays from the image sensors into a plurality of data planes;
   b. performing noise analysis to determine an average noise amplitude and noise distribution for each data plane via a gradient calculation;
   c. applying an edge mask to weaken isolated transients in one or more of the data planes;
   d. applying a noise filter using one or more levels of filtering to one or more of the data planes; and performing detail recovery combining one or more filtered and unfiltered data planes according to the noise analysis.

2. The method of filtering data to overcome data noise from data arrays from image sensors of claim 1 wherein the step of performing noise analysis comprises: determining the gradient calculation via a two-dimensional array.

3. The method of filtering data to overcome data noise from data arrays from image sensors of claim 1 wherein the step of performing noise analysis comprises creating a histogram configured to determine a noise curve, the noise curve identified using the histogram via statistical analysis.

4. The method of filtering data to overcome data noise from data arrays from image sensors of claim 1 furthering comprising the step of: combing one or more of the data planes to create one or more composite data planes to enable creating an edge mask and/or to enable detail recovery.

5. The method of filtering data to overcome data noise from data arrays from image sensors of claim 4 wherein the combining one or more of the data planes to create one or more composite data planes comprises combining the one or more of the data planes with one or more data planes originating from one or more data sources independent from the source of the plurality of data planes.

6. The method of filtering data to overcome data noise from data arrays from image sensors of claim 4 wherein the combining one or more of the data planes comprises the step of combining a color image plane and a composite image plane, the color image plane and the composite image plane having a modified spatial alignment with a plurality of superimposed pixel locations. A composite image plane can include an RGGB image plane or other combination of colored image planes. The contribution of each plane to the composite plane can be scaled for best effect, for example the planes may be scaled so that the plane with the best signal to noise ratio has a more pronounced influence.

7. The method of filtering data to overcome data noise from data arrays from image sensors of claim 1 wherein the gradient calculation comprises the step of: plotting a histogram of a plurality of gradient values to determine a maximum noise amplitude or minimum edge amplitude in an upper portion of the histogram and the average noise amplitude in a lower portion of the histogram.

8. The method of filtering data to overcome data noise from data arrays from image sensors of claim 3 wherein the noise analysis comprises the step of: creating a histogram configured to determine a noise curve, the noise curve identified using the histogram via statistical analysis.

9. The method of filtering data to overcome data noise from data arrays from image sensors of claim 3 wherein the noise analysis comprises the step of: locating a bin number at a determined middle of the histogram, and an upper end bin number of the histogram, the middle bin number representing the average noise amplitude, and the upper bin number representing a maximum noise amplitude or minimum edge amplitude.

10. The method of filtering data to overcome data noise from data arrays from image sensors of claim 1 further comprising: forming the noise filter by combining a color image plane and a composite image plane.

11. The method of filtering data to overcome data noise from data arrays from image sensors of claim 1 further comprising: forming the noise filter using an image plane by combining a color image plane and a composite image plane wherein the color image plane and the composite image plane have a modified spatial alignment wherein pixel locations are superimposed.

12. The method of filtering data to overcome data noise from data arrays from image sensors of claim 1 further comprising: scaling the output of the noise filter via a scaling function that receives the one or more data planes and an output of a detail recovery mask function.

13. The method of filtering data to overcome data noise from data arrays from image sensors of claim 12 further comprising:
recovering details of a filtered image via a ratio determined by an image detail recovery mask.

14. The method of filtering data to overcome data noise from data arrays from image sensors of claim 1 wherein the data is n-dimensional data, each data plane including one or more of a scalar, vector, and/or n-dimensional array.

15. The method of filtering data to overcome data noise from data arrays from image sensors of claim 1 wherein the data is image data collected from a Bayer pattern sensor array.

16. A computer program product comprising a computer readable medium configured to perform one or more acts for removing noise and/or aliasing from an image created from an image sensor array, the one or more acts comprising:
a. one or more instructions for separating image data into a plurality of image planes;
b. one or more instructions for performing noise analysis to determine an average noise amplitude and noise distribution for each image plane via a gradient calculation;
c. one or more instructions for applying an edge mask to weaken isolated transients in one or more of the image planes;
d. one or more instructions for applying a noise filter using one or more levels of filtering to one or more of the image planes; and
e. one or more instructions for performing detail recovery combining filtered and unfiltered images planes according to the noise analysis.

17. A computer system comprising:
a. a processor;
b. a memory coupled to the processor;
c. a processing module coupled to the memory, the processing module configured to attenuate noise, module including:
i. a filter configured to filter one or more data arrays by combining the data array to be filtered with one or more composite data arrays, the one or more data arrays including a modified spatial alignment, the filter including:
1. an separation module configured to separate data into a plurality of data planes;
2. an analysis module coupled to the separation module, the analysis module configured to perform noise analysis to determine an average noise amplitude and noise distribution for each data plane via a gradient calculation;
3. an edge mask coupled to the analysis module, the edge mask configured to protect edge data; and a noise filter using one or more levels of filtering to one or more of the data planes.

18. The computer system of claim 17 wherein the modified spatial alignment is a layered spatial alignment of Bayer image data, the Bayer image data being filtered directly independent of a pyramid structure.

19. The computer system of claim 17 wherein the one or more composite data arrays include an RGGB (red, red-row green, blue-row green, and blue) plane, the RGGB plane being used as a noise filter.

20. The computer system of claim 17 wherein the one or more composite data arrays include an RGGB (red, red-row green, blue-row green, and blue) plane, the RGGB plane being used to recover detail from an image.

21. The computer system of claim 17 wherein the one or more composite data arrays filter the one or more data arrays via an addition operation of the one or more composite data arrays with the one or more data arrays.

22. The computer system of claim 17 wherein the filter is coupled to a digital camera.

23. The computer system of claim 17 wherein the filter disposed within one or more of a field programmable gate array (FPGA), an application specific integrated circuit (ASIC), and/or a processor.

24. A method for filtering image data to overcome data noise from data arrays from image sensors, the method comprising the steps of:
a. separating image data from the data arrays from the image sensors into a plurality of data planes;
b. performing noise analysis to determine an average noise amplitude and noise distribution for each data plane via a gradient calculation, the noise analysis performed when ambient conditions of a sensor collecting the image data change;
c. estimating noise in the image data using the gradient calculation to determine an average value and a median value from the gradient calculation;
d. applying a noise filter using one or more levels of filtering to one or more of the data planes, the noise filter configured to protect one or more determined edges of the image data; and
e. performing detail recovery using a composite image plane combined with one or more filtered and unfiltered images planes according to the noise analysis.

25. The method of claim 24 wherein the method is performed in one or more of a field programmable gate array (FPGA), an application specific integrated circuit (ASIC), and/or a processor.

26. The method of claim 24 wherein the noise analysis comprises the step of: determining a two dimensional array, the two dimensional array providing self realizable spatial correspondences.

27. The method of claim 24 wherein image data is collected from a Bayer sensor array.

28. The method of claim 24 wherein image data is collected from a sensor array including a channel for clear and/or colorless data.

29. The method of claim 24 wherein the gradient calculation comprises: plotting a histogram of a plurality of gradient values to determine a maximum noise value (minimum edge value) in an upper portion of the histogram and the average noise amplitude in a lower portion of the histogram.

30. The method of claim 24 wherein the noise analysis comprises: creating a histogram configured to determine a noise curve, the noise curve identified using the histogram via statistical analysis, the statistical analysis including determining an average noise amplitude and a median noise value.

31. A method for noise filtering to overcome data noise from data arrays from image sensors comprising:
   a. separating image data from the data arrays from the image sensors into a plurality of data planes;
   b. performing noise analysis to determine an average noise amplitude and noise distribution for each data plane via a gradient calculation;
   c. estimating noise in the data using the gradient calculation to determine an average value and a median value from the gradient calculation; and
   d. applying a noise filter using one or more levels of filtering to one or more of the data planes, the noise filter configured to protect one or more determined edges of the data, the noise filter operating to filter out noise that is not masked by protecting the one or more determined edges of the data.

32. The method of claim 31 wherein the step of the applying the noise filter includes comprises the steps of:
   a. combining two or more data arrays having at least one uncorrelated aspect,
   b. the two or more data arrays sharing at least one correlated aspect to create a composite plane,
   c. the two or more data arrays originating from one or more of a plurality of signal sources, two or more image sources, two or more two-dimensional arrays of non-image data, one or more misaligned and/or missing valued sources, and one or more characteristics of a single signal source.

* * * * *